(12) United States Patent
Saito

(10) Patent No.: US 9,329,087 B2
(45) Date of Patent: May 3, 2016

(54) PYROELECTRIC-TYPE INFRARED SENSOR

(75) Inventor: Masahiro Saito, Sendai (JP)

(73) Assignee: NEC TOKIN CORPORATION, Sendai-Shi, Miyagi (JP)

( * ) Notice: Subject to any disclaimer, the term of this patent is extended or adjusted under 35 U.S.C. 154(b) by 0 days.

(21) Appl. No.: 14/374,413

(22) PCT Filed: Jul. 11, 2012

(86) PCT No.: PCT/JP2012/067710
§ 371 (c)(1),
(2), (4) Date: Jul. 24, 2014

(87) PCT Pub. No.: WO2013/111366
PCT Pub. Date: Aug. 1, 2013

(65) Prior Publication Data
US 2015/0053859 A1 Feb. 26, 2015

(30) Foreign Application Priority Data
Jan. 27, 2012 (JP) .................. 2012-014984

(51) Int. Cl.
*G01J 5/34* (2006.01)
*G01J 5/04* (2006.01)
*G01J 5/08* (2006.01)

(52) U.S. Cl.
CPC .. *G01J 5/04* (2013.01); *G01J 5/089* (2013.01); *G01J 5/34* (2013.01)

(58) Field of Classification Search
CPC ............ G01J 5/024; G01J 5/34; H01L 37/02; H01L 2224/48091
See application file for complete search history.

(56) References Cited

U.S. PATENT DOCUMENTS

| 4,800,278 | A | * | 1/1989 | Taniguti et al. ............ 250/338.1 |
| 5,962,854 | A | * | 10/1999 | Endo ............................. 250/349 |
| 2009/0266988 | A1 | * | 10/2009 | Honda et al. .................. 250/353 |
| 2011/0243162 | A1 | * | 10/2011 | Fujii et al. ....................... 372/21 |
| 2012/0298867 | A1 | * | 11/2012 | Nishikawa et al. ........ 250/338.3 |

FOREIGN PATENT DOCUMENTS

| CN | 101246055 | A | 8/2008 |
| JP | 62187277 | A | 8/1987 |
| JP | 62153532 | U | 9/1987 |
| JP | 04087668 | U | 7/1992 |
| JP | 04346037 | A | 12/1992 |

(Continued)

OTHER PUBLICATIONS

International Search Report dated Oct. 23, 2012 issued in International Application No. PCT/JP2012/067710.

(Continued)

*Primary Examiner* — Christine Sung
(74) *Attorney, Agent, or Firm* — Holtz, Holtz & Volek PC

(57) ABSTRACT

A pyroelectric-type infrared sensor is provided with: a sensor element; a shield case for covering the sensor element; an infrared transmission filter; an output circuit, which performs impedance conversion to output signals of the sensor element and outputs the signals; and at least one reflecting film. In the pyroelectric-type infrared sensor, the at least one reflecting film, which reflects infrared, is provided between the infrared transmission filter attached to the shield case and surface electrodes, and the infrared transmission filter is disposed extremely close to the surface electrodes.

5 Claims, 5 Drawing Sheets

(56) References Cited

FOREIGN PATENT DOCUMENTS

| | | | |
|---|---|---|---|
| JP | 06331437 | A | 12/1994 |
| JP | 07243909 | A | 9/1995 |
| JP | 09015040 | A * | 1/1997 |
| JP | 3043381 | U | 11/1997 |

OTHER PUBLICATIONS

Japanese Office Action dated Oct. 11, 2012 issued in counterpart Japanese Application No. 2012-014984.
Chinese Office Action (and English translation thereof) dated Aug. 4, 2015, issued in counterpart Chinese Application No. 201280064254.9.

* cited by examiner

PYROELECTRIC-TYPE INFRARED SENSOR

TECHNICAL FIELD

This invention relates to a pyroelectric type infrared sensor and, in particular, to a pyroelectric type infrared sensor which has a sufficient detection capability within a range of several meters.

BACKGROUND ART

A pyroelectric type infrared sensor is one kind of an infrared sensor and comprises, as a detection pixel, a pyroelectric element in which a front face and a rear face of a pyroelectric substrate are respectively provided with electrodes.

A front face charge is present on the front face of the pyroelectric substrate by spontaneous polarization. In general, the front face charge attracts a floating charge of its surrounding so that the front face charge of the pyroelectric substrate is kept at an electrically neutral state if a temperature around the pyroelectric substrate remains constant.

A state of spontaneous polarization of the pyroelectric substrate changes according to a change in the temperature around the pyroelectric substrate. A change of a state of spontaneous polarization is more rapid than a response of a floating charge present around the pyroelectric substrate so that an electrically neutral state on the front face of the pyroelectric substrate is broken. As the result, the front face charge is generated on the front face of the pyroelectric substrate. The front face charge is taken out from an electrode as an output signal so that the pyroelectric element is used as a sensor. Most of pyroelectric type infrared sensors use the aforementioned pyroelectric element as their detection pixels and each comprises a group of sensor elements consisting of a plurality of pyroelectric elements.

As an example of a pyroelectric type infrared sensor, Patent document 1 discloses a pyroelectric type infrared sensor called compensation single type. The pyroelectric type infrared sensor comprises an electrode (photodetecting main element) which detects infrared radiation and an electrode (temperature compensation element) which monitors a temperature change of its surroundings to compensate the temperature change.

In Patent Document 1, a window portion of a shield case (outer can) of an infrared ray filter is provided with a filter. Infrared ray passes through the filter so as to be made incident on only the photodetecting main element. The temperature compensation element is shielded so as not to be affected from infrared ray incoming from outside.

Patent Document 2 discloses a dual type infrared sensor in which two pyroelectric elements having polarizing directions different from each other are connected in serial or in parallel.

PRIOR ART DOCUMENTS

Patent Document(s)

Patent Document 1: JP-Y 3043381
Patent Document 2: JP-A 62-187277

SUMMARY OF INVENTION

Technical Problem

Structures (shape and dimension) of the photodetecting main element and the temperature compensation element which are disclosed in Patent document 1 and Patent Document 2 are restricted by a size of the shield case and an area of an opening through which infrared ray is transmitted.

For example, if the opening which is formed on an upper surface of the shield case is enlarged to increase infrared ray irradiation amount and to widen a viewing angle of a sensor, infrared ray might be diffracted into the temperature compensation element to affect a sensitivity of the sensor. On the other hand, if the area of the opening is reduced, not only an irradiation range and an irradiation amount of infrared ray are restricted but also the viewing angle of the sensor is narrowed and a sensor output is decreased.

In addition, if the area of the opening is not changed, the viewing angle of the sensor is narrower as a distance between the photodetecting main element and the opening is longer and is wider as the distance is shorter. However, in a case where a shield plate and a condensing mirror are disposed in a space of the opening and a sensor element, a certain space is required between the shield case and the sensor element. An existence of the space is a limiting factor of an allowable setting range of the viewing angle in an actual design and impedes a miniaturization of the sensor.

It is therefore an object of the present invention to provide a small pyroelectric type infrared sensor which can have a wide viewing angle and obtain a sufficient output.

Solution to Problem

An aspect of the present invention provides, as a first pyroelectric type infrared sensor, a pyroelectric type infrared sensor comprising a sensor element, a shield case, an infrared ray transmitting filter, an output circuit and at least one reflecting film. The shield case covers the sensor element. The output circuit converts an impedance of an output signal of the sensor element to output it. The sensor element has at least one pyroelectric element. The pyroelectric element comprises a pyroelectric substrate, a front face electrode and a rear face electrode, wherein the pyroelectric substrate has a front face as a light receiving surface and a rear face opposite to the front face, the front face electrode is provided on the front face, and the rear face electrode is provided at a position corresponding to the front face electrode on the rear face. The shield case has an opening. The opening is formed to be positioned above the front face electrode. The infrared ray transmitting filter is provided on the opening. The reflecting film reflects infrared ray incoming from outside. At least a part of the reflecting film is positioned at a region between the infrared ray transmitting filter and the front face electrode.

The front face electrode and the rear face electrode are arranged to sandwich the pyroelectric substrate and to correspond to each other so that a capacitor is formed. It is preferable that an electrode area of the front face electrode is enlarged so as to obtain the front face charge corresponding to an amount of received infrared ray as much as possible. A capacitance of the sensor element is enlarged as the electrode area is enlarged so that S/N ratio of the sensor is enhanced.

In addition, a front face of the front face electrode is coated with an infrared absorbing film made of titanium oxide, carbon or the like so that an absorption efficiency of infrared ray is heightened. In other words, an high sensitive infrared sensor which has a high heat efficiency and is immune to an external noise is obtained.

An output electrode extracting the output signal of the sensor is provided on the rear face of the pyroelectric substrate in addition to the rear face electrode. It is preferable that the output electrode is disposed as far away as possible from the front face electrode and the rear face electrode. Accordingly, radiation of heat which is absorbed on the front face electrode can be reduced.

Although it is preferable that a shield case uses 42 alloy which is superior in electromagnetic shielding performance and has a low linear expansion coefficient, inexpensive Fe-based metal or material in which nonmagnetic metal is subjected to surface treatment by nickel plating or the like may be used as its substitute.

The infrared ray transmitting filter is manufactured by forming a multilayer consisting of layers of zinc sulfide or the like on an infrared ray transmission material made of silicon, germanium or the like. It is preferable that a wavelength of infrared ray which can pass through the infrared ray transmitting filter is 5 μm to about 15 μm. If necessary, a transmissivity can be improved by forming a multilayer consisting of anti-reflection films.

Although it is preferable that the output circuit is composed of only a junction type field effect transistor, a resistor having a high resistance value (several G Ω to about several ten G Ω) may be connected in parallel with the sensor element as needed. Accordingly, variation of reference voltage can be suppressed and a stable sensor output can be obtained.

Another aspect of the present invention provides, as a second pyroelectric type infrared sensor, the first pyroelectric type infrared sensor, wherein: the front face electrode has at least two regions and a connection portion which connects the two regions; and the reflecting film is provided so as to face the connection portion.

Still another aspect of the present invention provides, as a third pyroelectric type infrared sensor, the first or the second pyroelectric type infrared sensor, wherein the reflecting film is formed by a sputtering method or a vacuum evaporation method.

Yet another aspect of the present invention provides, as a fourth pyroelectric type infrared sensor, the first or the second pyroelectric type infrared sensor, wherein the reflecting film is formed by a printing method, a coating method, a transfer method or a dipping method.

Further aspect of the present invention provides, as a fifth pyroelectric type infrared sensor, the first or the second pyroelectric type infrared sensor, wherein: the reflecting film is formed on a front face of a thin plate; and the thin plate is adhered to the shield case or the infrared ray transmitting filter.

In addition, the front face electrode is divided into a plurality of front face electrodes and adjoining front face electrodes are made into a pair to be connected. Accordingly, one of the front face electrodes in the pair which is shielded by the reflecting film is usable as an temperature compensated electrode and the other is usable as an infrared ray detection electrode. Consequently, since the sensor element comes into a state where a polarity of the sensor element is inverted while the sensor element is connected in series, an influence of disturbance light can be reduced.

In addition, the reflecting film and a conductive pattern of the aforementioned front face electrodes which are made into the pair to be connected may be arranged so as to face each other. A detectable area (viewing angle) where each of the sensor elements can detect infrared ray is determined by a positional relation between each electrode of the pyroelectric elements and the reflecting film. Therefore, the reflecting film and the conductive pattern are arranged to face each other so that the viewing angles are arranged so as not to cross each other.

Advantageous Effects of Invention

In the pyroelectric type infrared sensor of the present invention, the reflecting film which reflects infrared ray incoming from outside is provided at a part of the region between the infrared ray transmitting filter and the front face electrode. In addition, the infrared ray transmitting filter and the front face electrode are in a close distance. As a result, the reflecting film can be used as an infrared ray shielding plate. Specifically, infrared ray can be prevented from being diffracted into a compensation electrode which needs to be shielded from infrared ray, so that the compensation electrode can be surely shielded from infrared ray.

In addition, the pyroelectric type infrared sensor of the present invention comprises an electrode on a light receiving side having a sufficient viewing angle. Furthermore, a clearance between the shield case and the sensor element is reduced so that miniaturization of the pyroelectric type infrared sensor is facilitated.

In addition, a distance between the infrared ray transmitting filter and the front face electrode is extremely short (i.e. the infrared ray transmitting filter and the front face electrode are arranged to be in an extremely close distance) so that the pyroelectric type infrared sensor in which the viewing angle can be freely changed in a high accuracy can be obtained. For example, in dual type pyroelectric type infrared sensor, two divided front face electrodes are connected with each other, and each detectable viewing angle of the front face electrodes is adjusted so as not to cancel one another. Accordingly, an infrared ray receiving region can be shared by each divided electrode.

With this structure, the pyroelectric type infrared sensor having a wide viewing angle as compared with a viewing angle formed by one electrode is obtained. Furthermore, a region where infrared ray is not detected (dead zone region) is provided in a detectable region of each light receiving electrode to detect an object entering/exiting to/from infrared ray receiving range so that the pyroelectric type infrared sensor which can detect a movement in a further narrow range is obtained.

In addition, the reflecting film may be formed by a sputtering method or a vacuum evaporation method. Its film thickness can be thinned by using the methods. The reflecting film having a thin film thickness has extremely low thermal capacity so that its heat radiation characteristic is improved. Accordingly, thermal influence on a sensor element can be reduced.

The reflecting film formed on the infrared ray transmitting filter may be formed by a printing method, a coating method, a transfer method or a dipping method. By the methods, the reflecting film can be formed without using a large-scale manufacturing equipment such as a sputtering equipment or a vacuum evaporation equipment. In other words, a pyroelectric type infrared sensor can be manufactured at low cost.

In addition, instead of the aforementioned methods, a thin plate in which the reflecting film is formed on its front face is adhered to the shield case or the infrared ray transmitting filter so that a manufacture of the pyroelectric type infrared sensor is more simple.

An appreciation of the objectives of the present invention and a more complete understanding of its structure may be had by studying the following description of the preferred embodiment and by referring to the accompanying drawings.

DESCRIPTION OF EMBODIMENTS

Figure 1:
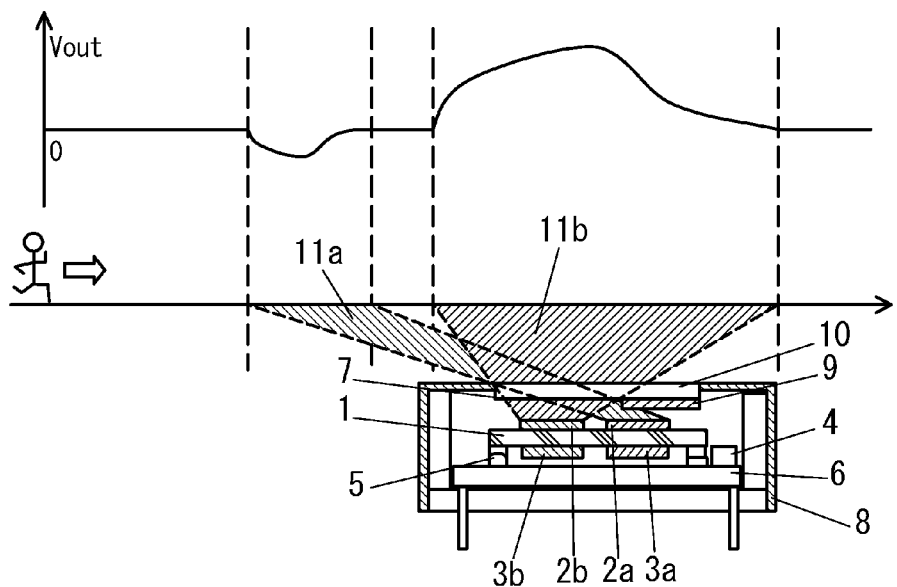
FIG. 1 is a view showing an action of a pyroelectric type infrared sensor and a voltage change of a front face electrode according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

[First Embodiment]

For example, an infrared sensor according to the present embodiment is used as described below. As shown in an upper part of FIG. 1, when a measuring object (human) enters into a viewing angle 11a of the infrared sensor from a left side of the FIG. 1, an electrically neutral state in the vicinity of a front face electrode 2a is broken so that a potential with respect to a voltage of Vout is detected in a negative side. When the measuring objet further continues its movement to enter into a viewing angle 11b, an electrically neutral state in the vicinity of a front face electrode 2b is broken so that the potential with respect to the voltage of Vout is detected in a positive side. Accordingly, the pyroelectric type infrared sensor is usable in a direction detection when the measuring object enters or exits.

As shown in FIG. 1, the pyroelectric type infrared sensor according to the present embodiment comprises a sensor element 1, a shield case 8, an infrared ray transmitting filter 7 and a reflecting film 9.

Figure 2:
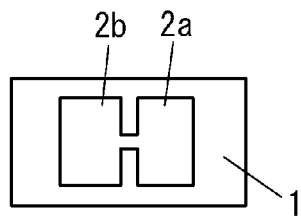
FIG. 2 is a plan view showing a front face of a sensor element of the pyroelectric type infrared sensor of FIG. 1.
Figure 3:
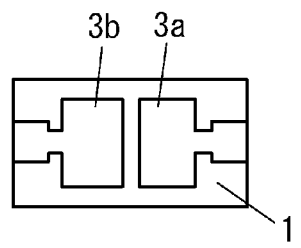
FIG. 3 is a plan view showing a rear face of the sensor element of the pyroelectric type infrared sensor of FIG. 1.

As shown in FIG. 2, the sensor element 1 according to the present embodiment has one pyroelectric element. The pyroelectric element comprises a pyroelectric substrate having a front face and a rear face, the front face electrodes 2a and 2b which are provided on the front face, and rear face electrodes 3a and 3b which are provided on the rear face. The front face of the pyroelectric substrate is a light receiving surface. The front face electrodes 2a and 2b are connected to each other and are arranged on the light receiving surface side (front face) of the pyroelectric substrate. The front face electrode 2a is used as a temperature compensation electrode, and the front face electrode 2b is used as a light receiving electrode. In addition, as shown in FIG. 3, the rear face electrodes 3a and 3b are arranged on the rear face of the sensor element 1. The rear face electrodes 3a and 3b are positioned to correspond to the front face electrodes 2a and 2b, respectively.

Figure 5:
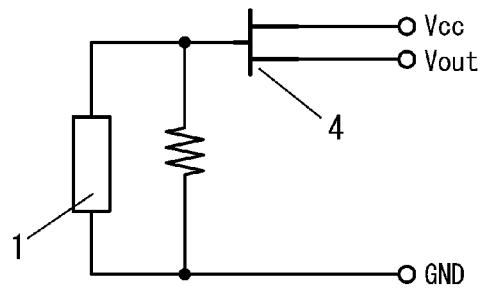
FIG. 5 is a block diagram showing a circuit of the pyroelectric type infrared sensor of FIG. 1.

As shown in FIGS. 1 and 3, output electrodes provided on the rear face electrodes 3a and 3b are adhered to a circuit board 6 by a conductive adhesive 5. On the circuit board 6, a junction type field effect transistor 4 is mounted as an impedance conversion circuit. As shown in FIG. 5, a gate input electrode of the junction type field effect transistor 4 and a GND are connected to the rear face electrodes 3a and 3b, respectively. The junction type field effect transistor 4 converts an impedance of an output signal of the sensor element 1 to output it.

Figure 4:
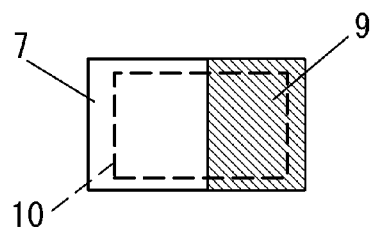
FIG. 4 is a plan view showing an infrared ray transmitting filter of the pyroelectric type infrared sensor of FIG. 1.

As shown in FIG. 1, an outer periphery of the circuit board 6 is covered with the shield case 8. The shield case 8 has an opening (window portion) 10. The opening 10 is formed so as to be positioned above the front face electrodes 2a and 2b. In other words, the front face electrodes 2a and 2b are visible through the opening 10. The infrared ray transmitting filter 7 is securely fixed to the opening 10. As shown in FIG. 4, the infrared ray transmitting filter 7 is provided with the reflecting film 9 which reflects infrared ray. The reflecting film 9 is positioned at a region between the infrared ray transmitting filter 7 and the front face electrode 2a. Specifically, the reflecting film 9 is provided above the front face electrode 2a and provided below the infrared ray transmitting filter 7. A part of the reflecting film according to the present embodiment faces the front face electrode 2a. The reflecting film 9 according to the present embodiment is an Ag film having a thickness of 0.5 μm.

In order not to affect a height of the sensor element, the reflecting film 9 is formed to have a thickness of 1 μm or less by the sputtering method, the vacuum evaporation method or the like. A thermal capacity of the reflecting film 9 is sufficiently smaller than a thermal capacity of the sensor element 1 so that an influence on a characteristics of the sensor element is extremely small. A forming process of this reflecting film can be executed simultaneously with a formation of the infrared ray transmitting film in a vacuum evaporation process which is included in a manufacturing process of the infrared ray transmitting filter 7.

In addition, the reflecting film 9 can be formed by either a printing method, a coating method, a transfer method or a dipping method. As another method, a thin plate in which the reflecting film is formed on its front face may be cut into a predetermined shape to be adhered to the shield case or the infrared ray transmitting filter. By these methods, the reflecting film can be formed without using a manufacturing facility such as a sputtering equipment or a vacuum evaporation equipment so that the pyroelectric type infrared sensor can be manufactured at low cost.

A viewing angle where infrared ray is detectable is determined by a positional relation among this reflecting film 9, the opening 10 of the shield case 8, and the front face electrodes 2a and 2b. The reflecting film 9 may be arranged outside the shield case (i.e. on the upper surface of the infrared ray transmitting filter 7). However, when the reflecting film 9 is arranged inside the shield case 8 (i.e. on the lower surface of the infrared ray transmitting filter 7), the viewing angle of the front face electrode 2a (temperature compensation electrode) is narrowed while the viewing angle of the front face electrode 2b (light receiving electrode) can be widened. Therefore, even if the viewing angles are overlapped, an area where a sensor output is canceled can be made extremely small. As a result, the pyroelectric type infrared sensor which has a sufficient detection capability within a range of several meters can be obtained.

[Second Embodiment]

Figure 6:
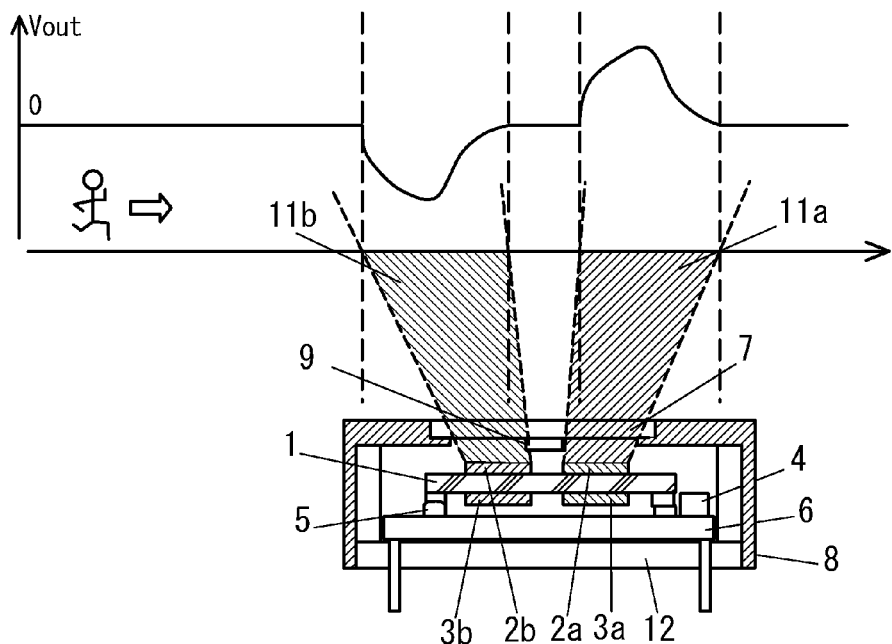
FIG. 6 is a view showing an action of a pyroelectric type infrared sensor and a voltage change of a front face electrode according to a second embodiment of the present invention.
Figure 7:
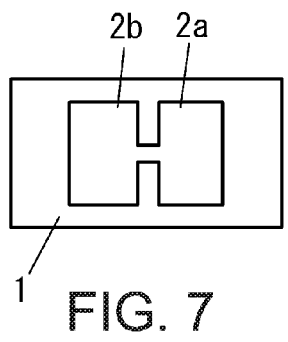
FIG. 7 is a plan view showing a front face of a sensor element of the pyroelectric type infrared sensor of FIG. 6.
Figure 8:
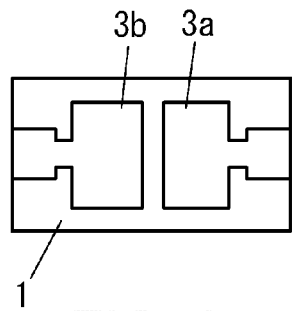
FIG. 8 is a plan view showing a rear face of the sensor element of the pyroelectric type infrared sensor of FIG. 6.
Figure 9:
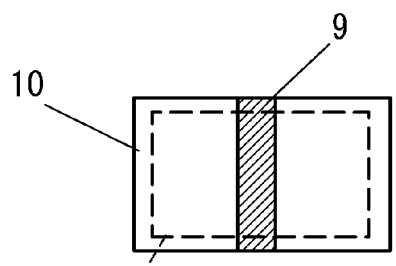
FIG. 9 is a plan view showing an infrared ray transmitting filter of the pyroelectric type infrared sensor of FIG. 6.

Referring to FIGS. 6 to 9, an infrared sensor according to a second embodiment of the present invention comprises the sensor element 1 same as that of the first embodiment. However, the second embodiment is different from the first embodiment in that both front face electrodes 2a and 2b are used as light receiving electrodes and that the reflecting film 9 is formed so as to cover an connecting pattern which is located halfway between the front face electrodes 2a and 2b as shown in FIGS. 6, 7 and 9.

A constitution according to the present embodiment generates a state where two pyroelectrics in which polarizing directions are different from each other are connected in series. Because a total amount of charge which is present on the front face electrodes 2a and 2b is constant, each output is cancelled even if charges are generated on both pyroelectric elements by an external temperature change, external light or the like. Consequently, an influence other than infrared ray is neglected.

An action of the pyroelectric type infrared sensor according to the present embodiment is herein explained with FIG. 6. As shown in FIG. 6, when the measuring object enters from a left side of FIG. 6 into the viewing angle 11b, the electrically neutral state in the vicinity of the front face electrode 2a is broken so that the potential with respect to the voltage of Vout is detected in the negative side. When the measuring object further continues its movement to enter into the viewing angle 11a, the electrically neutral state in the vicinity of the front face electrode 2b is broken so that the potential with respect to the voltage of Vout is detected in the positive side. Therefore, the pyroelectric type infrared sensor is usable in a direction detection when the measuring object enters or exits. In addition, by changing a width of the reflecting film, an intermediate region (dead zone region) where infrared ray is not detected in each viewing angle is easily formed. By detecting the object entering/exiting to/from the dead zone region from/to the viewing angle, the sensor can react even in a case where the measuring object moves in a narrower range.

In the present embodiment, it is preferable that the sensor element 1 and the circuit board 6 are mounted with a certain spacing. Accordingly, radiation of heat which is absorbed on the front face electrode of the sensor element can be reduced.

In addition, as a noise countermeasure, it is preferable that the infrared ray transmitting filter 7 is securely fixed to the opening of the shield case 8 while the shield case 8 is electrically connected with a ground of the circuit board 6.

The viewing angle where infrared ray is detectable is determined by the positional relation among this reflecting film 9, the opening 10 of the shield case 8, and the front face electrodes 2a and 2b. When the reflecting film 9 is formed so as to cover the connecting pattern, sensor output is never canceled because viewing angles of the front face electrodes 2a and 2b are not overlapped.

[Third Embodiment]

Figure 10:
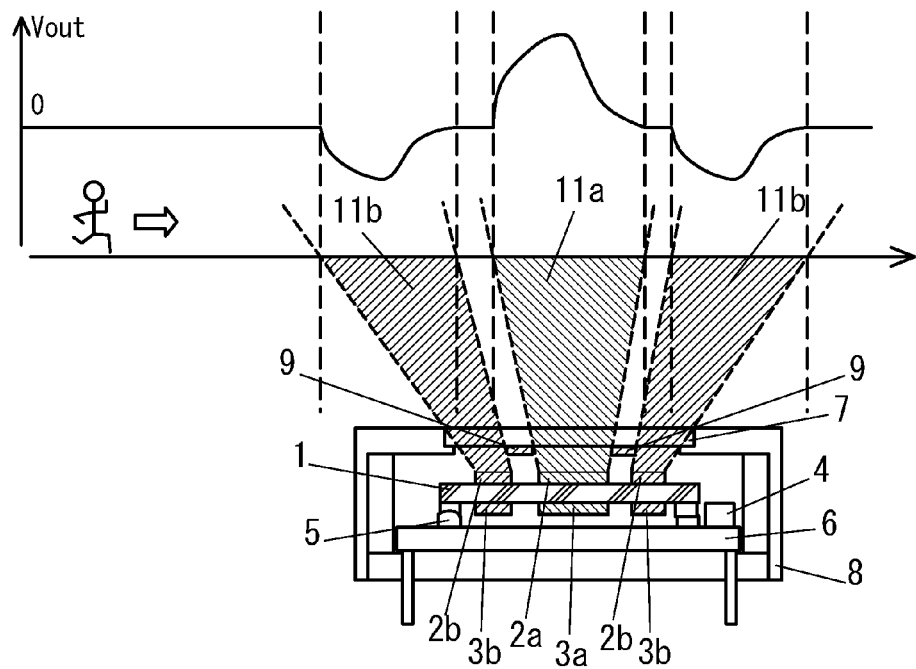
FIG. 10 is a view showing an action of a pyroelectric type infrared sensor and a voltage change of a front face electrode according to a third embodiment of the present invention.

An action of a pyroelectric type infrared sensor according to a third embodiment of the present invention is herein be explained with FIG. 10. As shown in an upper part of FIG. 10, in the infrared sensor according to the present embodiment, when the measuring object enters into a left side viewing angle 11b from a left side of the FIG. 10, the electrically neutral state in the vicinity of the front face electrode 2a is broken so that the potential with respect to the voltage of Vout is detected in the negative side. When the measuring objet further continues its movement to enter into the viewing angle 11a, the potential is detected in the positive side. Furthermore, when the measuring objet further continues its rightward movement to enter into a right side viewing angle 11b, the electrically neutral state in the vicinity of the front face electrode 2b is broken so that negative potential of Vout is detected. In addition, the dead zone region which do not belong to either of the viewing angles 11a and 11b is formed between the viewing angles 11a and 11b so that a detection region can be subdivided. The sensor output is obtained not only in a case where the measuring object crosses each region but also in a case where a slight movement is done.

Figure 11:
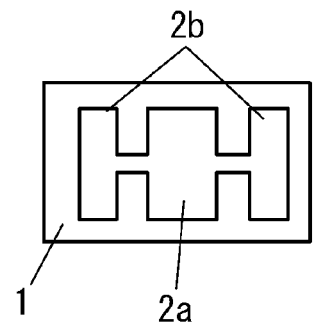
FIG. 11 is a plan view showing a front face of a sensor element of the pyroelectric type infrared sensor of FIG. 10.
Figure 12:
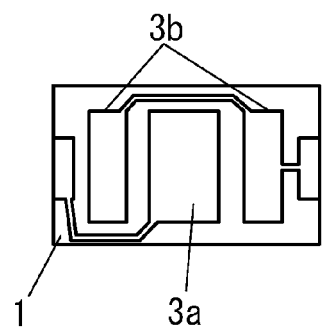
FIG. 12 is a plan view showing a rear face of the sensor element of the pyroelectric type infrared sensor of FIG. 10.

As shown in FIG. 11, the sensor element 1 has a front face electrode 2a disposed at a center of the pyroelectric substrate, and front face electrodes 2b disposed at opposite sides of the front face electrode 2a. The front face electrode 2a is connected to the two front face electrodes 2b by connecting patterns. The front face electrode 2a and the front face electrodes 2b are the same in height. A width of the front face electrode 2b is about a half of a width of the front face electrode 2a. Furthermore, as shown in FIG. 12, the rear face electrodes 3a and 3b are arranged on the sandwiched pyroelectric substrate to correspond to the front face electrodes 2a and 2b, respectively.

Figure 13:
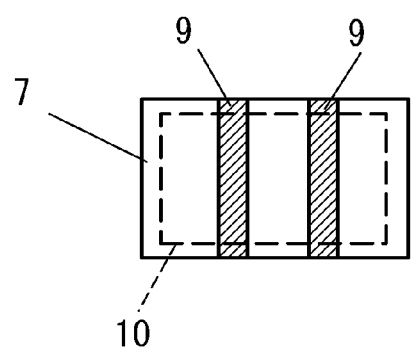
FIG. 13 is a plan view showing an infrared ray transmitting filter of the pyroelectric type infrared sensor of FIG. 10.

As shown in FIG. 13, the reflecting film 9 is formed, similar to the aforementioned second embodiment, so as to cover the connecting pattern which connects the front face electrode 2a to the front face electrodes 2b. The viewing angle where infrared ray is detectable is determined by the positional relation among this reflecting film 9, the opening 10 of the shield case 8, the front face electrodes 2a and 2b. When the reflecting film 9 is formed so as to cover the connecting pattern, viewing angles of the front face electrodes 2a and 2b are not overlapped so that sensor output is not canceled.

[Fourth Embodiment]

Figure 14:
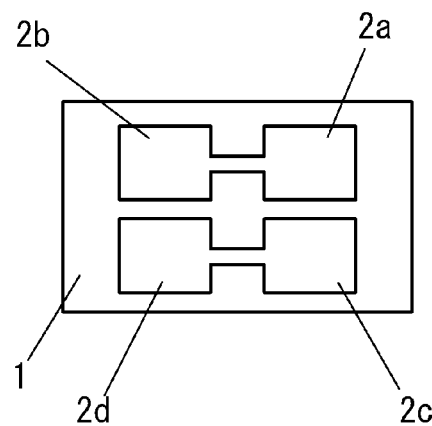
FIG. 14 is a plan view showing a front face of a sensor element of a pyroelectric type infrared sensor according to a fourth embodiment of the present invention.
Figure 15:
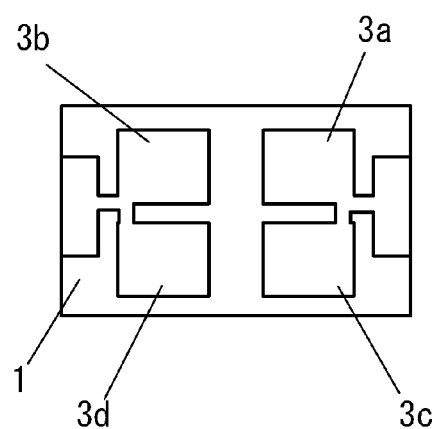
FIG. 15 is a plan view showing a rear face of the sensor element of the pyroelectric type infrared sensor according to the fourth embodiment of the present invention.
Figure 16:
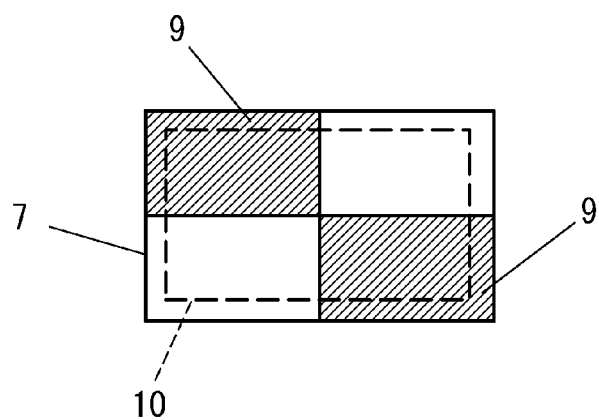
FIG. 16 is a plan view showing an infrared ray transmitting filter of the pyroelectric type infrared sensor according to the fourth embodiment of the present invention.

As shown in FIG. 14, a sensor element 1 of the infrared sensor according to a forth embodiment of present invention comprises four front face electrodes 2a, 2b, 2c and 2d. Areas of the front face electrodes 2a, 2b, 2c and 2d are equal to one another. The front face electrode 2a and the front face electrode 2b are connected with each other while the front face electrode 2c and the front face electrode 2d are connected with each other. As shown in FIG. 15, rear face electrodes 3a, 3b, 3c and 3d, which are formed to correspond to these front face electrodes, respectively, are formed on the rear face of the sensor element 1. The front face electrodes 2a and 2b are connected with each other by an output electrode while the front face electrodes 2c and 2d are connected with each other by an output electrode. As shown in FIG. 16, the reflecting films 9 are provided at an area above the front face electrode 2b and at an area above the front face electrode 2c in four areas into which the infrared ray transmitting filter is equally divided crosswise. With such a configuration, a detailed position can be detected as compared to a sensor having two electrodes. Similarly, an array type element where a plurality of electrodes are arrayed because of a need of fine detection can be easily configured.

Without limited to these embodiments, various ideas may be introduced into them within scopes of claims and modifications may be made thereto according to various demands.

The present application is based on a Japanese patent application of JP2012-014984 filed before the Japan Patent Office on Jan. 27, 2012, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 1 sensor element
2a, 2b, 2c, 2d front face electrode
3a, 3b, 3c, 3d rear face electrode
4 junction type field effect transistor
5 conductive adhesive
6 circuit board
7 infrared ray transmitting filter
8 shield case
9 reflecting film
10 opening
11a, 11b viewing angle

The invention claimed is:

1. A pyroelectric type infrared sensor comprising a sensor element, a shield case, an infrared ray transmitting filter, an output circuit, and at least one reflecting film, wherein:
the shield case covers the sensor element;
the output circuit converts an impedance of an output signal of the sensor element to output it;
the sensor element has at least one pyroelectric element;
the pyroelectric element comprises a pyroelectric substrate, a front face electrode, and a rear face electrode, the pyroelectric substrate having a front face as a light receiving surface and a rear face opposite to the front face, the front face electrode being provided on the front face, the rear face electrode being provided at a position corresponding to the front face electrode on the rear face, and the front face electrode comprising a light receiving electrode and a temperature compensation electrode;
an opening is provided in the shield case at a position above the front face electrode;
the infrared ray transmitting filter is provided on the opening;
the reflecting film reflects an incoming infrared ray;
at least a part of the reflecting film is positioned at a part of a region between the infrared ray transmitting filter and the temperature compensation electrode;
the infrared ray transmitting filter has a lower surface located on a lower side thereof and an upper surface located on an upper side thereof, the lower surface facing the front face electrode; and
the reflecting film is arranged only on the lower surface of the infrared ray transmitting filter.

2. The pyroelectric type infrared sensor as recited in claim 1, wherein:
the front face electrode has at least two regions and a connection portion which connects the two regions.

3. The pyroelectric type infrared sensor as recited in claim 1, wherein the reflecting film is formed by a sputtering method or a vacuum evaporation method.

4. The pyroelectric type infrared sensor as recited in claim 1, wherein the reflecting film is formed by a printing method, a coating method, a transfer method or a dipping method.

5. The pyroelectric type infrared sensor as recited in claim 1, wherein:
the reflecting film is formed on a surface of a thin plate; and
the thin plate is adhered to the shield case or the infrared ray transmitting filter.

* * * * *